(12) United States Patent
Davidson et al.

(10) Patent No.: US 6,952,485 B1
(45) Date of Patent: Oct. 4, 2005

(54) WATERMARK ENCODING AND DECODING IN IMAGING DEVICES AND IMAGING DEVICE INTERFACES

(75) Inventors: Clayton L. Davidson, Lake Oswego, OR (US); Aruna B. Kumar, Camas, WA (US)

(73) Assignee: Digimarc Corporation, Beaverton, OR (US)

( * ) Notice: Subject to any disclaimer, the term of this patent is extended or adjusted under 35 U.S.C. 154(b) by 720 days.

(21) Appl. No.: 09/659,125

(22) Filed: Sep. 11, 2000

(51) Int. Cl.$^7$ .............................................. G06K 9/00
(52) U.S. Cl. ...................... 382/100; 358/3.28; 380/42; 713/176
(58) Field of Search ........................ 358/3.28; 380/42; 382/100; 713/176

(56) References Cited

U.S. PATENT DOCUMENTS

| | | | |
|---|---|---|---|
| 5,257,119 A | 10/1993 | Funada et al. ............... | 358/438 |
| 5,315,098 A | 5/1994 | Tow ............................ | 235/444 |
| 5,481,377 A | 1/1996 | Udagawa et al. ........... | 358/501 |
| 5,483,069 A * | 1/1996 | Kofune et al. ............ | 250/341.8 |
| 5,537,223 A | 7/1996 | Curry ......................... | 358/460 |
| 5,621,810 A * | 4/1997 | Suzuki et al. ............... | 382/135 |
| 5,629,980 A * | 5/1997 | Stefik et al. .................. | 705/54 |
| 5,652,626 A | 7/1997 | Kawakami et al. ......... | 348/461 |
| 5,671,277 A | 9/1997 | Ikenoue et al. ................ | 380/7 |
| 5,689,626 A * | 11/1997 | Conley ...................... | 358/1.18 |
| 5,765,176 A | 6/1998 | Bloomberg ................. | 707/514 |
| 5,857,038 A | 1/1999 | Owada et al. ............... | 382/284 |
| 5,859,920 A | 1/1999 | Daly et al. .................. | 382/115 |
| 5,862,260 A | 1/1999 | Rhoads ....................... | 382/232 |
| 5,892,900 A | 4/1999 | Ginter ........................ | 345/186 |
| 5,919,730 A | 7/1999 | Gasper et al. .............. | 503/201 |
| 6,032,201 A * | 2/2000 | Tillery et al. ................. | 710/8 |
| 6,185,312 B1 | 2/2001 | Nakamura et al. .......... | 382/100 |
| 6,192,138 B1 | 2/2001 | Yamadaji .................... | 382/100 |
| 6,233,684 B1 | 5/2001 | Stefik et al. ................ | 713/176 |
| 6,256,110 B1 | 7/2001 | Yoshitani ................... | 358/1.9 |
| 6,285,776 B1 | 9/2001 | Rhoads ....................... | 382/100 |
| 6,311,214 B1 | 10/2001 | Rhoads ....................... | 709/217 |
| 6,325,420 B1 | 12/2001 | Zhang et al. ................. | 283/70 |
| 6,334,721 B1 | 1/2002 | Horigane ..................... | 400/76 |
| 6,345,104 B1 | 2/2002 | Rhoads ....................... | 382/100 |
| 6,366,685 B1 | 4/2002 | Takaragi ..................... | 382/140 |
| 6,369,904 B1 | 4/2002 | Bhattacharjya et al. .... | 358/1.14 |
| 6,384,935 B1 | 5/2002 | Yamazaki ................... | 358/1.9 |

(Continued)

FOREIGN PATENT DOCUMENTS

EP            493091        7/1992   ......... H04N 1/387

(Continued)

OTHER PUBLICATIONS

U.S. Appl. No. 60/082,228, filed Apr. 16, 1998, Rhoads.

(Continued)

*Primary Examiner*—Andrew W. Johns
*Assistant Examiner*—Patrick L. Edwards
(74) *Attorney, Agent, or Firm*—Digimarc Corporation

(57) ABSTRACT

The disclosure details methods and systems for watermark encoding and decoding in imaging devices, such as printers and scanners, and imaging device interfaces. Watermark encoding and decoding functions are incorporated into printer and scanner image processing pipelines. Watermark encoders and decoders perform watermark encoding and decoding, respectively, on an image as it is being transferred from one stage of a printing or scanning process to another. In particular, streaming mode watermark encoders and decoders operate on sequential portions of the image in a sequential image stream passing from one stage to another. The streaming mode encoder and decoder may be incorporated in a printer or scanner driver in a computer connected to a printer or scanner peripheral or within a printer or scanner device.

15 Claims, 3 Drawing Sheets

U.S. PATENT DOCUMENTS

| | | | |
|---|---|---|---|
| 6,411,392 B1 * | 6/2002 | Bender et al. | 358/1.14 |
| 6,427,020 B1 | 7/2002 | Rhoads | 382/100 |
| 6,442,284 B1 | 8/2002 | Gustafson et al. | 382/100 |
| 6,449,377 B1 | 9/2002 | Rhoads | 382/100 |
| 6,549,638 B2 | 4/2003 | Davis et al. | 382/100 |
| 6,553,127 B1 | 4/2003 | Kurowski | 382/100 |
| 6,556,688 B1 * | 4/2003 | Ratnakar | 382/100 |
| 6,614,914 B1 | 9/2003 | Rhoads et al. | 382/100 |
| 6,650,761 B1 | 11/2003 | Rodriguez et al. | 382/100 |
| 2001/0006551 A1 | 7/2001 | Masaki | 380/51 |
| 2001/0006585 A1 | 7/2001 | Horigane | 400/70 |
| 2001/0007130 A1 | 7/2001 | Takaragi | 713/186 |
| 2001/0017704 A1 | 8/2001 | Akiyama | 358/1.9 |
| 2001/0017709 A1 | 8/2001 | Murakami et al. | 358/1.14 |
| 2001/0023421 A1 | 9/2001 | Numao et al. | 707/9 |
| 2001/0028727 A1 | 10/2001 | Naito et al. | 382/100 |
| 2001/0030759 A1 | 10/2001 | Hayashi et al. | 358/1.9 |
| 2001/0049788 A1 | 12/2001 | Shur | 713/179 |
| 2002/0001095 A1 | 1/2002 | Kawakami et al. | 358/1.9 |
| 2002/0012444 A1 | 1/2002 | Nishikawa et al. | 382/100 |
| 2002/0018223 A1 | 2/2002 | Kashihara | 358/1.2 |
| 2002/0021825 A1 | 2/2002 | Rhoads | 382/100 |
| 2002/0037093 A1 | 3/2002 | Murphy | 382/112 |
| 2002/0048369 A1 | 4/2002 | Ginter et al. | 380/277 |
| 2002/0051237 A1 | 5/2002 | Ohara | 358/468 |
| 2002/0054356 A1 | 5/2002 | Kurita et al. | 382/100 |
| 2002/0054692 A1 | 5/2002 | Suzuki et al. | 358/3.28 |
| 2002/0090110 A1 | 7/2002 | Braudaway et al. | 382/100 |

FOREIGN PATENT DOCUMENTS

| | | | | |
|---|---|---|---|---|
| EP | 1096782 | 5/2001 | | H04N 1/32 |
| EP | 1152592 | 7/2001 | | H04N 1/32 |
| EP | 1156662 | 11/2001 | | H04N 1/387 |
| EP | 711061 | 5/2002 | | H04N 1/00 |
| GB | 2346110 | 2/2000 | | B41M 3/14 |
| WO | WO9626494 | 8/1996 | | G06F 17/30 |
| WO | WO 9743736 | * 11/1997 | | G06K 9/36 |
| WO | WO0036785 | 6/2000 | | H04L 9/00 |
| WO | 01/74053 | 10/2001 | | H04N 1/32 |

OTHER PUBLICATIONS

U.S. Appl. No. 60/112,955, filed Dec. 18, 1998, Rhoads et al.
U.S. Appl. No. 60/176,693, filed Jan. 18, 2000, Shaw.
U.S. Appl. No. 09/428,359, filed Oct. 28, 1999, Davis et al.
U.S. Appl. No. 09/465,418, filed Dec. 16, 1999, Rhoads et al.
U.S. Appl. No. 09/619,264, filed Jul. 19, 2000, Kumar.
U.S. Appl. No. 09/765,102, filed Jan. 17, 2001, Shaw.
"Access Control and COpyright Protection for Images, WorkPackage 8: Watermarking," Jun. 30, 1995, 46 pages.
Alattar, "'Smart Images' Using Digimarc's Watermarking Technology," SPIE 12th Int'l Symposium on Electronic Imaging, Vo. 3971, No. 25, Jan. 25, 2000, pp. 1-10.
Bender et al., "Applications for Data Hiding," IBM Systems Journal, vol. 39, No. 3-4, 2000, pp. 547-568.
Burgett et al., "A Novel Method for Copyright Labeling Digitized Image Data," Sep. 7, 1994?, 12 pages.
"Cyphertech Introduces Anti-Piracy Fingerprint," May, 1993, 1 page.
"Digital Fingerprinting Will Deter Pirates, Company Claims" Sep. 1, 1993, 1 page.
Gruhl et al., "Information Hiding to Foil the Casual Counterfeiter," Proc. 2d Information Hiding Workshop, LNCS vol. 1525, Apr. 14, 1998, 15 pages.
Knox et al., Digital Watermarks Using Stochastic Screens, SPIE vol. 3018, Apr. 1, 1997, pp. 316-322.
Koch et al., "Copyright Protection for Multimedia Data," Proc. of the Int. Conf. on Digital Media and Electronic Publishing, Leeds, U.K., Dec. 16, 1994, 15 pages.
"Major Studios to Participate in Test of Anti-Piracy Weapon," Oct. 1, 1993, 1 page.
"Tracking TV," Aug. 1, 1993, 1 page.
van Schyndel et al., "Towards a Robust Digital Watermark," ACCV '95, vol. 2, Dec. 5, 1995, pp. 504-508.
Wagner, "Fingerprinting," 1983 IEEE, pp. 18-22.

* cited by examiner

WATERMARK ENCODING AND DECODING IN IMAGING DEVICES AND IMAGING DEVICE INTERFACES

RELATED APPLICATION DATA

This patent application is related to U.S. patent application 09/428,359, filed Oct. 28, 1999 (now U.S. Pat. No. 6,674,886), which is a division of application Ser. No. 09/185,380, filed Nov. 3, 1998 (now U.S. Pat. No. 6,549,638). A PCT counterpart of the '380 application has been published as WIPO publication WO0026749. This patent application is also related to-pending application 09/465,418, filed Dec. 16, 1999, which claims priority benefit to provisional application 60/112,955, filed Dec. 18, 1998.

The subject matter of the present application is related to that disclosed in U.S. Pat. No. 5,862,260, and in application Ser. No. 09/503,881, filed Feb. 14, 2000 (Now U.S. Pat. No. 6,614,914); which are hereby incorporated by reference.

TECHNICAL FIELD

The invention relates to digital watermarking technology, and specifically relates to incorporating such technology in imaging devices such as scanners and printers and interfaces for these devices.

BACKGROUND AND SUMMARY

Digital watermarking is a process for modifying physical or electronic media to embed a machine-readable code into the media. The media may be modified such that the embedded code is imperceptible or nearly imperceptible to the user, yet may be detected through an automated detection process. Most commonly, digital watermarking is applied to media signals such as images, audio signals, and video signals. However, it may also be applied to other types of media objects, including documents (e.g., through line, word or character shifting), software, multi-dimensional graphics models, and surface textures of objects.

Digital watermarking systems typically have two primary components: an encoder that embeds the watermark in a host media signal, and a decoder that detects and reads the embedded watermark from a signal suspected of containing a watermark (a suspect signal). The encoder embeds a watermark by altering the host media signal. The reading component analyzes a suspect signal to detect whether a watermark is present. In applications where the watermark encodes information, the reader extracts this information from the detected watermark.

Several particular watermarking techniques have been developed. The reader is presumed to be familiar with the literature in this field. Particular techniques for embedding and detecting imperceptible watermarks in media signals are detailed in the assignee's co-pending application Ser. No. 09/503,881 (now U.S. Pat. No. 6,614,914) and U.S. Pat. No. 5,862,260, which are hereby incorporated by reference.

The invention relates to watermark encoding and decoding in imaging devices, such as printers and scanners, and imaging device interfaces. One aspect of the invention is a method and system for image watermark decoding in a print process pipeline. The method performs watermark decoding on an image as it is being transferred from one stage of a printing process to another. In particular, in one implementation, a streaming mode watermark decoder operates on sequential portions of the image in a sequential stream passing from one stage of a print process to another. The streaming mode decoder may be incorporated in a printer driver in a computer connected to a printer peripheral or within a printer device.

This type of watermark decoder can be incorporated into a printer driver or printer device for a variety of applications. One application is counterfeit deterrence. Specifically, the decoder can be used to detect a watermark in a high value document (e.g., bank note, check, authentication label, ticket, identity document, etc.) as it is being printed and inhibit the printing process so that printer output is incomplete. Another application is to associate the image being printed with metadata and to render that metadata during the print process. The watermark includes metadata or a reference to metadata in an external database (either within the printer system or in a remote database via a network connection, e.g., on the Internet). Rendering the metadata may include displaying information and/or executing some program or hardware function associated with the image being printed, such as fetching and rendering a related web page referenced via the watermark message.

Another aspect of the invention is a method and system for image watermark encoding in a print process pipeline. The method performs watermark encoding on an image as it is being transferred from one stage of a printing process to another. In particular, in one implementation, a streaming mode watermark encoder operates on sequential portions of the image in a sequential stream passing from one stage to another. This type of encoder can be incorporated into a printer driver or printer device for a variety of applications.

One application is to encode user information as a document is being printed. This user information may be used for counterfeit deterrence by embedding tracer information in the document that will help identify the maker of the counterfeit document. Another application is to associate other forms of metadata about the document as it is being printed by embedding the metadata or a reference to the metadata in a watermark.

Yet another aspect of the invention is a method and system for image watermark decoding in a scanner pipeline. The method performs watermark decoding on an image as it is being transferred from one stage of a scanning process to another. In particular, in one implementation, a streaming mode watermark decoder operates on sequential portions of the image in a sequential stream passing from one stage to another. This type of decoding can be used for a variety of applications, including those mentioned previously for printer drivers and devices. In particular, it can be used to discontinue the unauthorized image scan of a high value document, such as a bank note, identify document, ticket, check, etc. Further, information decoded from the watermark may include metadata or a reference to metadata in an external database. Upon decoding this information, the watermark decoder fetches and renders the metadata.

Yet another aspect of the invention is a method and system for image watermark encoding in a scanner pipeline. The method performs watermark encoding on an image as it is being transferred from one stage of a scanning process to another. In particular, in one implementation, a streaming mode watermark encoder operates on sequential portions of the image in a sequential stream passing from one stage to another. This type of decoding can be used for a variety of applications, including those mentioned previously for printer drivers and devices. One application is to encode user information in an image before it is transmitted to another process or application. For example, in fax machines, the encoder may be used to embed information about the sender or receiver of a fax image in the image before transmitting the image over a telephone connection.

By incorporating watermark functions in imaging devices or their drivers, these functions are inherently available for many software processes or hardware devices that communicate with the imaging devices.

Further features will become apparent with reference to the following detailed description and accompanying drawings.

DETAILED DESCRIPTION

There are a number of applications where it is advantageous to incorporate image watermark encoding and decoding functions into imaging devices, such as scanners and printers, and interfaces of these devices, such as software drivers. One application is counterfeit deterrence where watermarks are used to deter reproduction of high value documents such as bank notes, identity documents, packaging, labels, certificates of authentication, tickets, etc. Another application is to use information conveyed in a watermark to control use, transfer or rendering of a watermarked image. Yet another application is to associate metadata with an image.

To incorporate these watermarking applications in imaging devices and their interfaces, it is beneficial to be able to perform watermarking operations in a streaming mode on portions of an image as it is being scanned or printed. In this context, streaming mode refers to a type of watermark function that operates on sequential portions of an image as these portions are being transferred from one process or device to another. It is typical, for example, for software drivers to pass sequential portions of an image to a printer for printing. Similarly, it is typical for software drivers of a scanner to receive sequential portions of an image from a scanning device. In many cases, it is necessary or beneficial for watermark functions to operate on a sequential portion of an image without re-accessing image data that has previously passed and to complete operation on one portion before beginning the same operation on the next portion in a sequential stream.

Figure 1:
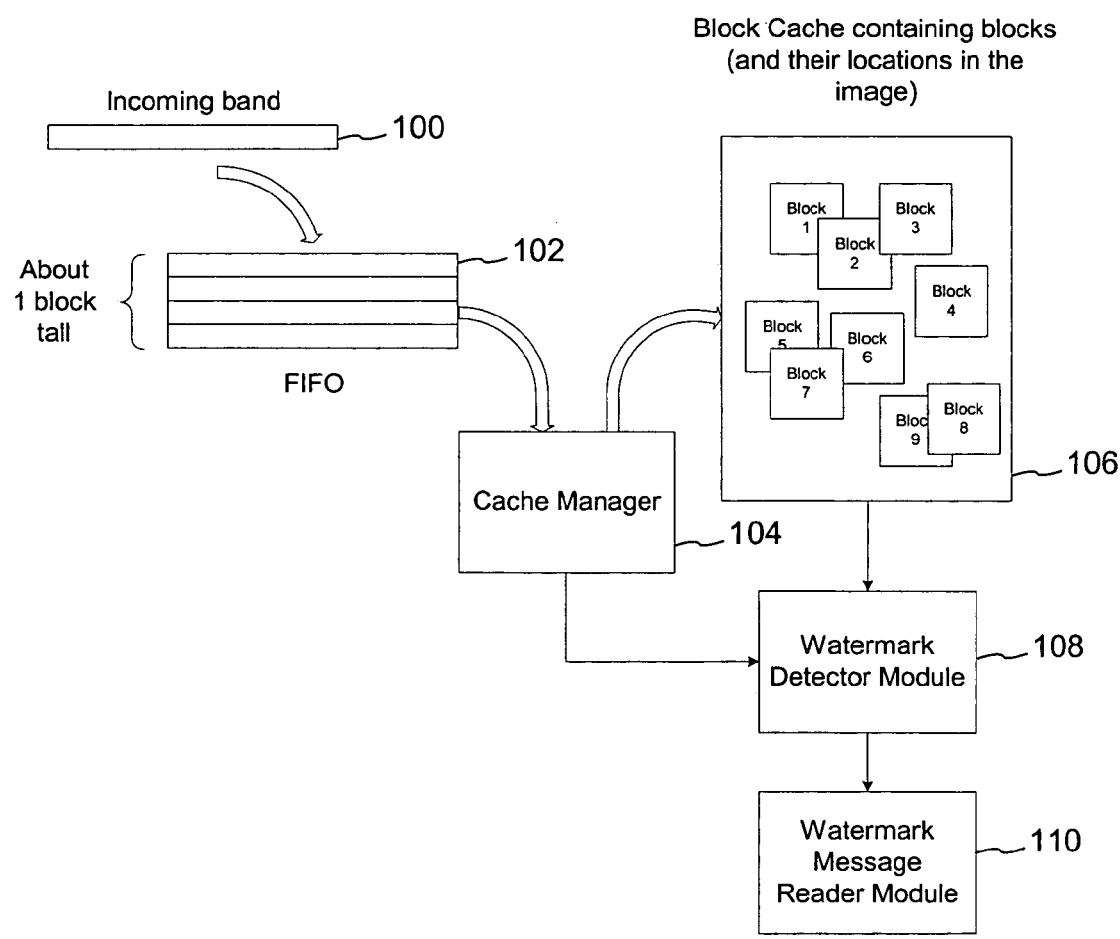
FIG. 1 is a diagram of a streaming mode watermark decoder.

FIG. 1 is a diagram of a streaming mode watermark decoder. The streaming mode watermark decoder processes incoming portions of an image to detect the presence of a watermark, and read a message encoded in the watermark. The detector intercepts and buffers portions of image data as it is being transferred. The buffer holds a most recently received portion of the image. It analyzes blocks of image data in the buffer to assess the likelihood that they include a known type of watermark. For candidate blocks that it identifies, the detector proceeds to execute watermark detection and read operations.

Looking at FIG. 1 in more detail, the decoder operates on incoming bands (100) of image data. A band is a set of contiguous scan lines of pixels in the image. The decoder temporarily stores the N most recent bands of image data in a First In-First Out (FIFO) buffer (102). The decoder selects the number N based on the height of the bands so that the FIFO holds a sequential portion of the image that is at least as high as a block of image data. A block is a unit of image data upon which the decoder performs decoding operations. The size and shape of a band and block may vary with the implementation, depending on such factors as the watermark decoding algorithm and watermark signal protocol. In a previous embedding process on the image, a watermark encoder replicates instances of a watermark signal throughout the image, and the block size is sufficiently large to enable the decoder to detect a watermark instance, and possibly recover an entire watermark message from that instance.

The format of the image data in the incoming band and FIFO vary with the implementation, depending on a number of considerations. One consideration is memory usage of the FIFO buffer. Another consideration is processing time. Another consideration is the type of image data needed to perform a decoding operation (e.g., full color information, luminance information, a binary bitmap such as a half-tone image, etc.). To save memory and processing time, the decoder may operate on down-sampled image data. In addition, rather than requiring color data per pixel, such as RGB or YUV triplets per pixel, the decoder may operate on single color channel, such as a luminance value per pixel or on half-tone, binary bitmap information. In some cases, as noted below, additional image data, such as color information is preferable over a single color channel, like luminance, because it may be used to improve the accuracy of a watermark detection and message recovery.

The decoder includes a cache manager (104) that maintains a set of image blocks from the FIFO buffer in a block cache (106). The block cache stores image data and block location information for each block. The decoder performs detection operations on the set of image blocks in this cache. To fill the cache, the cache manager analyzes image data in the FIFO and selects a set of K blocks that are likely candidates for having recoverable watermark signal. These blocks may overlap.

The criteria used to select these candidate blocks depends on the watermark embedding function and known attributes of watermarked images. The cache manager selects blocks having statistical features (signal activity, edges, colors) that make them likely candidates for having a detectable and recoverable watermark signal. In one implementation, a watermark encoder embeds an auxiliary message into a host signal by adding a perceptually adapted, pseudorandom pattern into a particular color channel of certain types of documents. This pattern is perceptually adapted such that signal intensity of the pattern increases in noisy areas of the image. The noisy blocks provide good candidates for hiding a watermark in the encoder, and for detecting and recovering a watermark in the decoder. As such, the cache manager ranks blocks based on a measure of watermark hiding and detectability characteristics. Specific measures of these characteristics include signal activity or signal energy and the quantity of edges in a candidate block.

The cache manager may also use known attributes of the types of documents containing watermarks to analyze the blocks. For example, some types of watermarks may be known to have a particular color composition. By looking at color data, the cache manager can rank blocks based at least in part on whether the colors match colors known to be in certain watermarked documents.

When adequate new blocks are available, the cache manager 104 instructs a detector module 108 to perform watermark detection functions on the K candidate blocks in the cache. The specific criteria for triggering a detection operation vary with the implementation. Some examples of the criteria include: 1) when the cache manager has identified a new candidate block or blocks; 2) when N new bands are loaded into the FIFO; 3) criteria based on attributes of watermarked images being sought (dimensions of watermarked image, colors of watermarked image, evidence of visible patterns detected in image, etc.).

Once triggered, detection stages in the detection module attempt to detect a watermark in each of the blocks, and to determine its orientation. If one is identified in a block, the detector module invokes a message reader module 110 to perform a read operation using the orientation parameters to align image data and extracting an auxiliary message embedded in the watermark. The specific details of the detection and read operations depend on the specifics of the watermark algorithm and watermark signal protocol. Some examples of these functions are set forth in detail in U.S. Pat. No. 5,862,260, and in co-pending application Ser. No. 09/503,881, filed Feb. 14, 2000 (now U.S. Pat. No. 6,614,914); which are hereby incorporated by reference.

Figure 2:
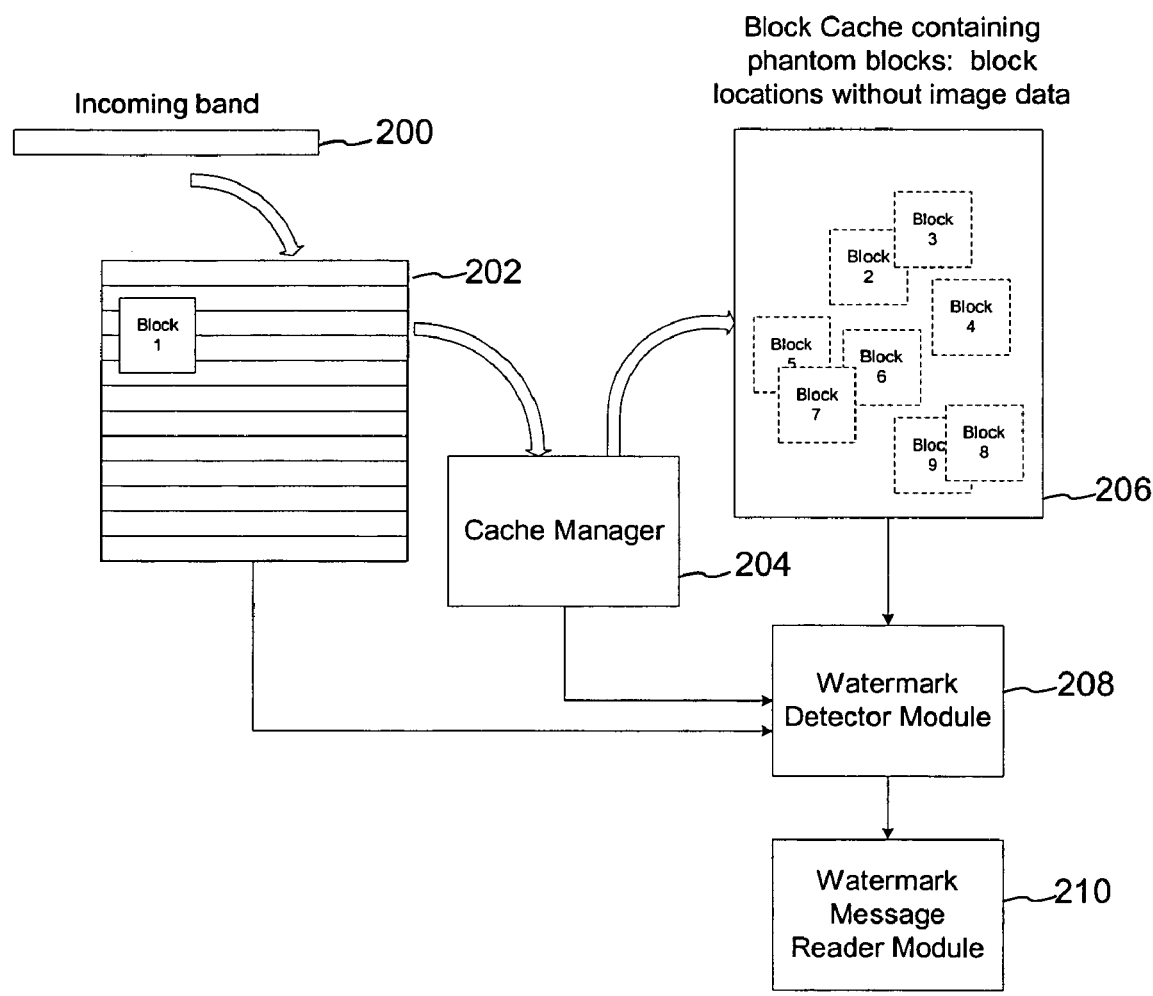
FIG. 2 is a diagram of another streaming mode watermark decoder.

FIG. 2 is a diagram of an alternative streaming mode watermark decoder. Like the decoder in FIG. 1, this one operates on sequential bands 200 of an image from another process or device. It buffers incoming bands in a band FIFO 202. The cache manager 204 analyzes image blocks in the FIFO 202, selects candidate blocks for phantom caching in a block cache 206, and triggers a watermark detector module 208 using similar criteria as described previously. The watermark detector and message reader modules (208, 210) operate in a similar fashion as the decoder in FIG. 1.

This decoder in FIG. 2 differs from the one in FIG. 1 in that the FIFO buffers additional image data and the block cache does not store image data. Instead, the cache manager maintains a phantom cache in which it maintains information about the location of each block, but the not the corresponding image data for the block. When it triggers the detector, the cache manager provides the address of the phantom cached blocks in the FIFO (e.g., a pointer) to the detector module 208. The detector module then reads the blocks from the band FIFO directly, rather than reading them from the block cache as in the decoder shown in FIG. 1.

Figure 3:
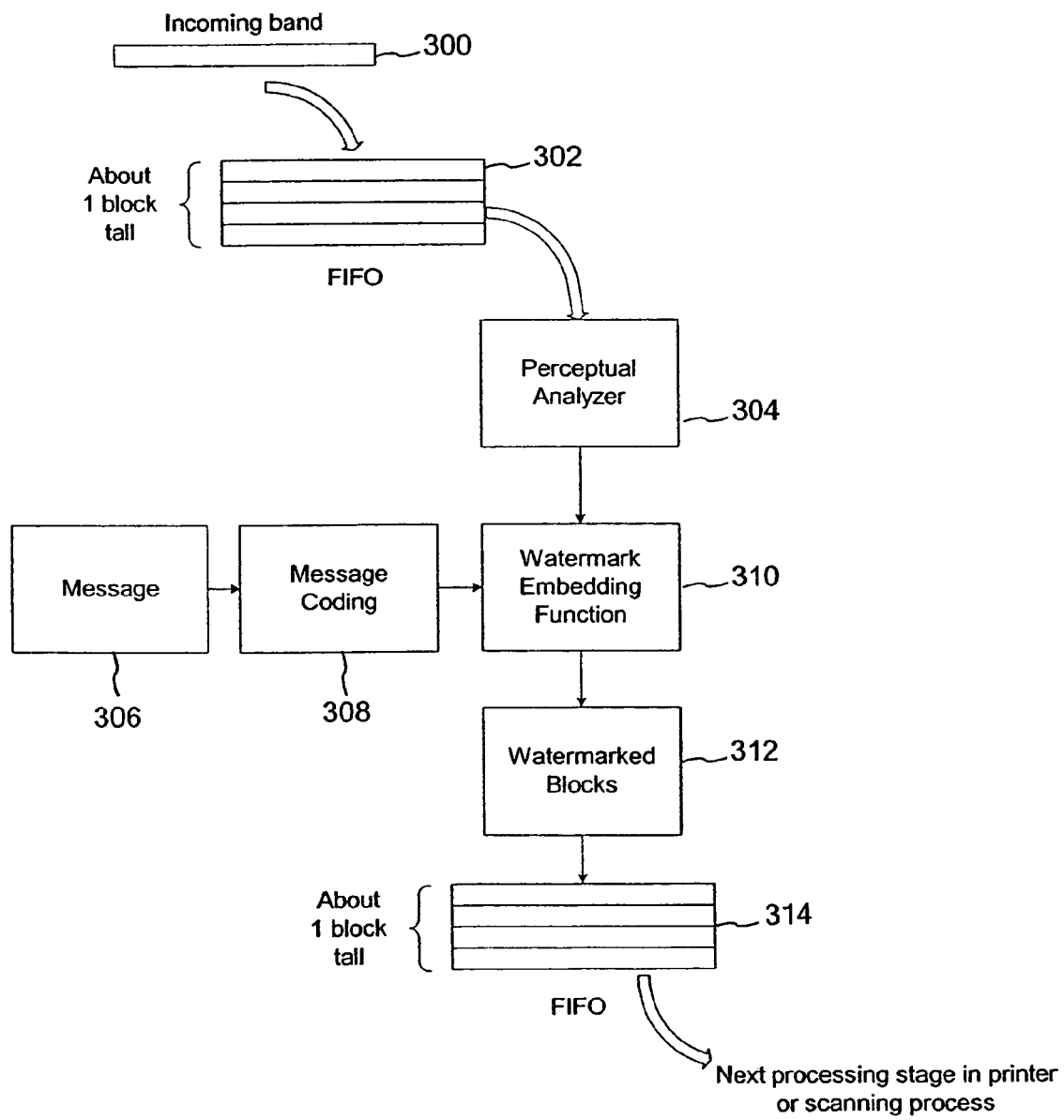
FIG. 3 is a diagram of a streaming mode watermark encoder.

FIG. 3 is a diagram of a streaming mode encoder. The streaming mode encoder receives incoming, sequential bands 300 of an image. It buffers these bands in a band FIFO 302 that is at least one block in height. A block in the context of image watermark encoding refers to the size of image data into which a watermark encoder module embeds an entire watermark signal instance. The FIFO includes two separate buffers, enabling the embedder to load one with incoming data while performing embedding operations on image blocks in the other one. 5

When one of the band FIFOs is filled with new image data, a perceptual analyzer 304 analyzes the pixel data in the block to compute a perceptual mask. In one implementation, this perceptual mask is an array of watermark gain control values used to modulate the strength of corresponding samples in an image watermark signal. Each gain control value corresponds to an element or group of neighboring elements in the spatial domain of a watermark signal. The gain control values are computed as a function of the corresponding samples in the host image being watermarked. In particular, they are a function of the local signal activity (e.g., local contrast and image signal edge measurements). For more information about computing a perceptual mask, see U.S. patent applications Ser. No. 09/596,658, filed on Jun. 19, 2000 (now U.S. Pat. No. 6,631,198), and entitled Perceptual Modeling of Media Signals Based on Local Contrast and Directional Edges; and Ser. No. 09/503,881, filed Feb. 14, 2000 (now U.S. Pat. No. 6,614,914).

Separately, the watermark encoder prepares an auxiliary message 306 for encoding into the image. The message is comprised of a set of binary or M-ary symbols. In this implementation, the message is repeated in each block. However, it is possible to vary the message over different parts of an image by changing the message input to the watermark encoder.

The message coding module 308 transforms the message into a watermark message signal. This process includes adding control bits to the message (fixed codes that assist in aligning the image, and error detection symbols derived based on the other message symbols). It also includes error correction encoding, such as using convolution, BCH, Reed Solomon, turbo codes, etc. Finally, it includes a spread spectrum modulation function in which the error corrected message symbols are spread over a pseudo random carrier image. In particular, the encoder spreads each binary symbol of the error correction encoded message over a pseudorandom number using a spread spectrum modulator (e.g., XOR for binary symbols, multiplier for binary antipodal symbols), and the resulting binary signal elements are mapped to locations in the host image block.

A watermark embedding function 310 embeds the watermark message signal into the host signal, using the perceptual mask from the perceptual analyzer to modulate the signal intensity. There are a variety of watermark embedding functions detailed in watermarking literature, including patents and other publications. The embedding function may modulate spatial domain pixel values in a selected color channel (e.g., chrominance or luminance), or modulate frequency coefficients such as wavelet, Fourier, DCT transform coefficients, etc. The embedding function may modulate signal amplitudes or some other statistical feature such that that feature corresponds to a desired message signal element to be encoded. In one implementation, the embedding function modulates amplitudes of spatial pixel values in the luminance channel. Selected pixels are adjusted up, while others are adjusted down corresponding to a corresponding element in the watermark message signal.

In addition, in some applications where the watermarked signal is expected to survive geometric transformation, the watermark embedding function also embeds a watermark orientation signal (also referred to as a calibration or synchronization signal). This signal comprises an array of impulse functions that form peaks in the Fourier Magnitude domain of the image block. The impulse functions have pseudorandom phase to make them imperceptible or nearly imperceptible, yet their known phase enables the watermark detector module to compute the origin (e.g., the vertical and horizontal offset or translation) of the watermark signal in a distorted version of the watermarked image. The detector module correlates the orientation signal with a log polar remapping (Fourier Mellin transform) of the watermarked signal to determine rotation and scale parameters of the watermark signal in a distorted version of the watermarked signal. The watermark, including the orientation signal, is imperceptible or substantially imperceptible in the watermarked signal.

The streaming mode encoder transfers watermarked blocks 312 into another FIFO buffer 314. This FIFO is also double buffered, enabling the embedding function to fill one FIFO, while transferring bands from the other buffer to the next stage in the printing or scanning process in which the streaming mode encoder is incorporated.

The watermark systems depicted in FIGS. 1–3 can be implemented for a variety of different applications and watermarking algorithms. This architecture is particularly well suited for incorporating watermark decoder functionality into a printer or scanner driver. In both cases, the driver is a software interface to a peripheral device, namely a scanner or printer, or a device that includes both image scanning and printing subsystems such as a fax machine or copier. The driver executes on a processor in a computer connected to the peripheral device. The driver enables application programs executing in the computer, including the operating system, to communicate with the peripheral. The application program communicates data and instructions to the driver via a programming interface, sometimes referred to as an API. The driver communicates hardware specific instructions and data to and from the peripheral.

Typically, these types of software drivers only pass sequential portions of an image to or from the peripheral during printing or scanning operations. As such, a streaming mode watermark architecture is particularly well suited for performing watermark functions on a sequential stream of image data as it is being transferred between the driver and peripheral.

The streaming mode architecture is also well suited for use within printer or scanner devices, including multi-function devices like fax machines, copiers, and integrated copier, fax machine, printer and scanner devices. Many of these devices have internal processors and memory that manage the internal operations of the imaging device. For example, to manage printing operations, such devices include a combination of software, hardware, and firmware.

In typical printing process, an image passes through a number of stages referred to as the printer pipeline. This pipeline may be implemented in a driver, in the printer, or in some combination of the driver or printer device. The printer pipeline typically includes a raster module and a render module. The input to the pipeline is either text or an image. Images are commonly input in a standard digital image format, such as array of RGB and YUV pixels. The raster module performs image processing functions like stretching, anti-aliasing to convert the image into a desired size and resolution. The render module then takes the rasterized image and coverts it into a binary bitmap (e.g., halftone format) for printing. For color printing, the render module performs a color mapping to the color format of the printer, such as a CMYK representation, where each color channel has a corresponding binary bit map or half tone representation.

The streaming mode architecture is well suited for the printer pipeline within a printer device or driver because various stages of the pipeline operate on and pass sequential portions of the image to subsequent stages. To incorporate watermark functionality, a watermark module intercepts sequential portions of image data at a selected stage in the pipeline and applies the watermark function.

Within a printer, for example, a watermark function may be applied to sequential portions of the image as it enters the rasterizing stage, as it enters the rasterizing phase, or as it exits the rasterizing stage.

The streaming mode architecture is also suited for scanner pipeline within a scanner device or driver. The scanner pipeline receives an image as it is being captured via an image sensor. The scanned image data typically gets color mapped into a standard form such as RGB or YUV and sent in sequential portions to another processing stage or device. A watermark function may be applied to the sequential portions of an image as it is captured from the image sensor or after it is color mapped.

The incorporation of a streaming mode watermark encoder or decoder in printer and scanner drivers has a number of advantages. One advantage is that it enables the watermark functionality to operate in a manner that is independent of the application program that utilized the driver to send or receive image data from an imaging peripheral.

There are a number of design issues relating to incorporating watermark functions in drivers and imaging devices. One issue in drivers compatible with the Windows operating system is the software code format. Many drivers are written in 16 bit code.

Such drivers may require "thunking" across a 16 to 32 bit boundary in cases where the streaming mode watermark function is written in 32 bit format.

One of the implementations of the invention includes 32 bit streaming mode watermark function code integrated with a 16 bit printer driver compatible with the Windows 98 operating system. The printer driver calls an API of the watermark function code, which is implemented in C/C++ and compiled into a Dynamic Link Library that is linked to the printer driver at runtime. Thunking is a function call made across the 16:32 bit code boundary. The printer driver code must make a thunk to pass incoming image bands of RGB data and related image data (such as image dimensions) to the watermark function API. The implementation minimizes the performance impact of this thunk by using a 16:32 bit bridge to the 32 bit watermark function code to pass the image band data. In particular, the bridge employs simple data structure types that include only band and image data necessary to perform the watermark function. The bridge includes assembly code to ensure that the 32 bit code correctly addresses memory that is accessed using 16 bit pointers in the 16 bit driver.

The implementation employs a thunk to pass image band data to the watermark function through its API. The API avoids a thunk back to the 16 bit code to return the results of the watermark function by filling in 16 bit parameters in the 16 bit code. These parameters represent the results of a watermark detection and read operation for a watermark decoder function.

Another implementation issue is the image data model used to represent the sequential stream of image data. In a printer driver implementation for the Windows 98 operating system, the image data model adheres to the data model established by the GDI module in the operating system. In a scanner driver implementation, the image data model adheres to the Twain Data Source standard for scanners.

Another design issue that applies to implementations in drivers or devices is where to intercept the image data in the scanning and printing process. The printer driver implementation described above intercepts bands of RGB data from the driver before the rasterizing and rendering processes in the printer pipeline. This interception point enables the watermark code to hide its latency within the latency of the subsequent rasterizing and rendering process. As an alternative, the watermark function can also intercept RGB bands of image data after the rasterizing process but before rendering, or could intercept CMYK binary bit map data after the rendering process.

Another design issue is whether to employ multi-threading in the streaming mode watermark function. Preferably the watermark function code (e.g., the watermark decoding and encoding functions) should execute on separate threads of execution so that the watermark function does not block the execution of other print or scanner pipeline processes.

Another design issue is the extent to which the watermark function retains information from watermark operations on previous blocks. For example, the watermark decoder operation can be optimized by retaining and using results from previous operations. For example, in one implementation, the detector module detects the watermark orientation signal by performing correlation (e.g., generalized match filtering) between the known orientation signal and the current image block in different transform domains, including the Fourier domain (magnitude or phase) and a log-polar resampling of the Fourier domain of the image block. Portions of an image block need not be transformed again into the Fourier domain or the log-polar resampling if they have been transformed in previous detection operations. Instead, the transformed data can be buffered in the detector module and re-used.

Additionally, the message information decoded from different blocks can be compiled to determine the embedded message symbols more accurately. For example, rather than performing error correction decoding on spread spectrum demodulated information from a single block, raw message information (i.e. message information not yet error corrected) can be compiled from several image blocks, and then periodically error correction decoded as additional message information is collected from multiple image blocks.

The geometric distortion, such as the scale, rotation, and translation, computed for previous blocks using the orientation signal is likely to be similar for other blocks. The orientation parameters for scale, rotation, translation, etc. can be used in subsequent correlation operations for additional image blocks. Rather than re-compute these parameters from scratch, the parameters for previous blocks can be used as starting points and refined in additional correlation operations.

As noted previously, there are a number of applications of the streaming mode watermark encoder and decoder functions. The encoder and decoder can operate independently or together. For example, in response to detecting a watermark or specific watermark message information with the decoder, the encoder can then be invoked to encode a watermark in the image being scanned or printed in response to the results of a streaming mode decoder operating on the image during the scan or print operation.

The watermark encoder can be used to embed tracer data in an image as it is being printed or transferred. The forensic tracer data may include: data identifying the date of an activity from a clock in the imaging device or host computer of the driver, data identifying the serial number of a computer system, data identifying a serial number of a system component, data identifying a user of the computer system, data identifying a file, data indicating the nature of a detected event, data indicating the status of the computer system, data from a registry database, data relating to an external network connection, and data derived from a digital watermark payload.

The encoder may be designed to embed this tracer data in the image in response to results of a streaming mode watermark decoding operation on the image.

The watermark decoder may be used to initiate one or more counterfeit deterrence actions such as: stopping printing or scanning, spoiling the printing or scanning output image by introducing artifacts or a visible marking like ("void", or "copy") into the image output, providing a notice to the user via a graphical user interface or audio output, etc. Preferably, the streaming mode decoder initiates one or more of these actions before the printing or scanning operation has completed. Such an action can be triggered when the watermark decoder detects a predetermined event. One event is detection that the correlation between the known watermark orientation signal and the watermarked image exceeds a threshold. Another event is accurately decoding a watermark message as determined by checking error detection symbols relative to other symbols in the watermark message.

The watermark decoder may also be used to initiate actions on metadata associated with the image via the watermark embedded in it. Because these actions are triggered from a streaming mode decoder, they can be performed during the printing or scanning of the image. The metadata may be included in the watermark message payload, or referenced via an identifier in the watermark message payload. The decoder may trigger the rendering of the metadata, which includes presenting graphical, image, video or audio data on a user interface or executing program instructions in the metadata.

The metadata may be stored in a database in the imaging device or in another device accessible to the imaging device or system via a wire or wireless network connection (wireless phone network, Internet, LAN, etc.). The watermark message may include an address, index, or URL. The decoder may trigger a programmatic process to fetch related information or program instructions from that address, index, or URL. For example, the decoder may fetch a web page stored at the URL or provide the URL to another application program, such as an Internet browser, for fetching and displaying a web page at the URL. Alternatively, the decoder may send the index to a database, which in turn, provides corresponding information or instructions back to the decoder. The database record matching the index may include yet another reference to information or instructions, such as a URL to a related web site. The database (e.g., web server) may either return this information to the decoder or route it to another device (e.g., web server), which in turn returns related information or instructions to the decoder (e.g., computer or imaging device where streaming mode decoder is executing). For related information on such applications for using watermarks to link watermarked content to information or actions, see U.S. Pat. No. 5,841,978 and U.S. application Ser. Nos. 09/571,422; 09/563,664 (now U.S. Pat. No. 6,505,160); and Ser. No. 09/574,726.

The watermark encoder may be implemented to include a user interface to enable the user to control whether an image is watermarked while being printed or scanned, and to specify the information to be embedded in the watermark. For example, the watermark encoding functionality may be selected via the printer or scanner dialog box of the printer or driver software. In this dialog box, the user can enter alphanumeric text for encoding in the image as it is being scanned or printed. For example, the user can enter a reference to an electronic version of the image being printed or scanned before it is printed or scanned. Additionally, the user can enter a reference to other information, such as a database record, a URL, a program, or other related information or data. The user can, for example, insert a reference to a licensing web page, or usage control information. A compatible decoder can then automatically trigger actions, such as rendering the metadata associated with the watermark message during subsequent printing or scanning operations on the image.

The watermark decoder may also have a user interface to enable the user to control watermark decoding, to apprise the user of decoding results, and to render metadata (information or programs) associated with an image via a watermark.

The watermark decoder can be further enhanced by combining it with additional modules for detecting visible patterns used in counterfeit deterrence, such as visible patterns of shapes used on bank notes. The pattern recognition module or modules can be spawned on separate threads yet operate on the same image data in the FIFO buffer as the watermark decoder. In the event that the pattern recognition module detects a predetermined pattern of a bank note or other secure document it triggers an action, such as inhibiting the print or scan process before it completes, informing the user, linking to a database or web site, etc. For more information on pattern recognition modules, see co-pending application 60/176,693, filed Jan. 18, 2000, and entitled Multistage Detection of Geometrical Structures or Patterns, which is incorporated by reference.

CONCLUDING REMARKS

Having described and illustrated the principles of the technology with reference to specific implementations, it will be recognized that the technology can be implemented in many other, different, forms. To provide a comprehensive disclosure without unduly lengthening the specification, applicants incorporate by reference the patents and patent applications referenced above.

The methods, processes, and systems described above may be implemented in hardware, software or a combination of hardware and software. For example, the watermark encoding processes may be implemented in a programmable computer or a special purpose digital circuit. Similarly, watermark decoding may be implemented in software, firmware, hardware, or combinations of software, firmware and hardware. The methods and processes described above may be implemented in programs executed from a system's memory (a computer readable medium, such as an electronic, optical or magnetic storage device).

The particular combinations of elements and features in the above-detailed embodiments are exemplary only; the interchanging and substitution of these teachings with other teachings in this and the incorporated-by-reference patents/applications are also contemplated.

We claim:

1. A method of image watermark decoding in a printing or scanning process comprising:

intercepting portions of an image as the portions pass from one stage of the printing or scanning process to another;

performing a watermark decoding operation on at least certain of said portions; and providing a result of the decoding operation before the printing or scanning process has completed for the image;

wherein the watermark decoding operation is performed in a driver executing in a computer as an image is being passed between an application program and a printer or scanner through the driver.

2. The method of claim 1 wherein the driver includes 16 bit code, the watermark operation is implemented in 32 bit code, and the watermark operation is invoked from the 16 bit code through an application programming interface of the 32 bit code.

3. The method of claim 2 wherein the 16 bit code passes image data to the 32 bit code over a 16 to 32 bit bridge, and the bridge includes code enabling the 32 bit code to access data structures in the 16 bit code.

4. A method of image watermark decoding in a printing or scanning process comprising:

intercepting portions of an image as the portions pass from one stage of the printing or scanning process to another;

performing a watermark decoding operation on at least certain of said portions, the watermark decoding being operable to decode a watermark that has been embedded redundantly in the image and varies in the image; and providing a result of the decoding operation before the printing or scanning process has completed for the image;

wherein the portions are buffered, and analyzed to select blocks for watermark detection operations.

5. The method of claim 4 wherein the analysis of the blocks in the buffer includes identifying potentially overlapping blocks that are likely to include a watermark signal.

6. The method of claim 4 wherein the result of the decoding operation is used to trigger an action before printing or scanning of the image is complete.

7. The method of claim 6 wherein the action includes stopping the printing or scanning of the image.

8. The method of claim 6 wherein the action includes using information in the watermark to fetch a web page related to the image.

9. A computer readable medium on which is stored software for performing the method of claim 6.

10. A method of image watermark decoding in a printing or scanning process comprising:

intercepting portions of an image as the portions pass from one stage of the printing or scanning process to another;

performing a watermark decoding operation on at least certain of said portions; and providing a result of the decoding operation before the printing or scanning process has completed for the image;

wherein the result of the decoding operation is used to trigger an action before printing or scanning of the image is complete; and wherein the action includes using information in the watermark to index related information about the image in a database.

11. A method of image watermark encoding in a printing process comprising:

intercepting portions of an image as the portions pass from one stage of a printing process to another;

performing a watermark encoding operation on at least certain of said portions, said encoding including encoding tracer data into the image in response to detecting a watermark in the image; and providing watermarked portions of the image to a subsequent stage in the printing process.

12. A method of image watermark encoding in a printing process comprising:

intercepting portions of an image as the portions pass from one stage of a printing process to another;

performing a watermark encoding operation on at least certain of said portions, said encoding including encoding calibration data into the image, said calibration data facilitating detection of a watermark in a geometrically distorted version of the watermarked image; and providing watermarked portions of the image to a subsequent stage in the printing process.

13. An imaging system comprising:

a device for scanning or printing an image;

a digital watermark decoder in communication with said device for intercepting portions of an image as the portions pass from one stage of a printing or scanning process to another, for performing a watermark decoding operation on at least certain of said portions; and for providing a result of the decoding operation before the printing or scanning process has completed, the decoder including a manager for selecting blocks for watermark decoding based on an analysis of characteristics of the blocks indicating which blocks are likely to have a recoverable watermark signal.

14. The system of claim 13 including a printer peripheral in communication with a computer, and a printer driver executing in the computer and incorporating the watermark decoder.

15. The system of claim 13 including a scanner peripheral in communication with a computer, and a scanner driver executing in the computer and incorporating the watermark decoder.

* * * * *